July 21, 1964
E. C. PROCTER
3,141,282
FLAIL TYPE ROW CROP HARVESTER
Filed April 26, 1962
4 Sheets-Sheet 1
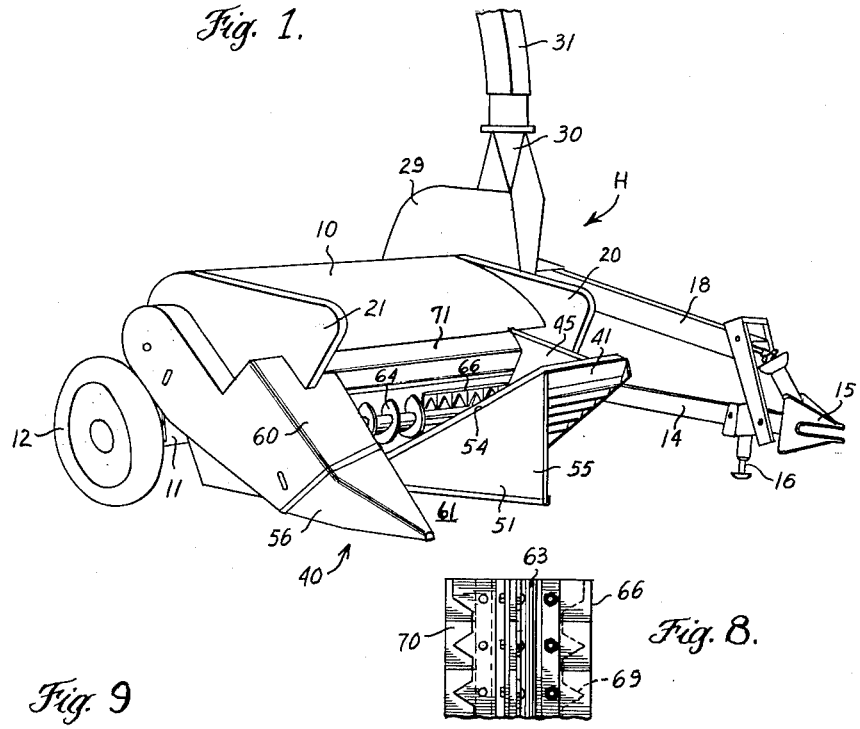
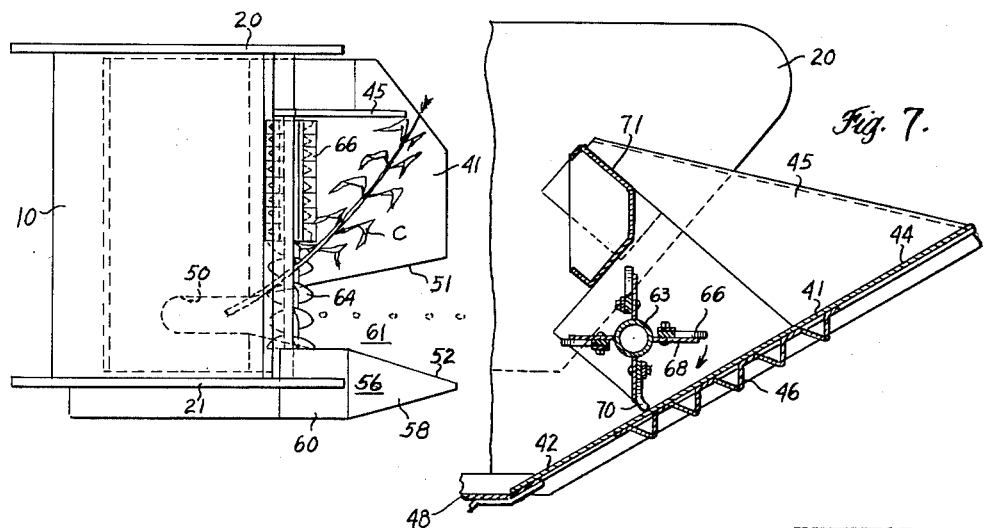
INVENTOR.
EDWARD C. PROCTER
BY
Joseph A. Brown
ATTORNEY

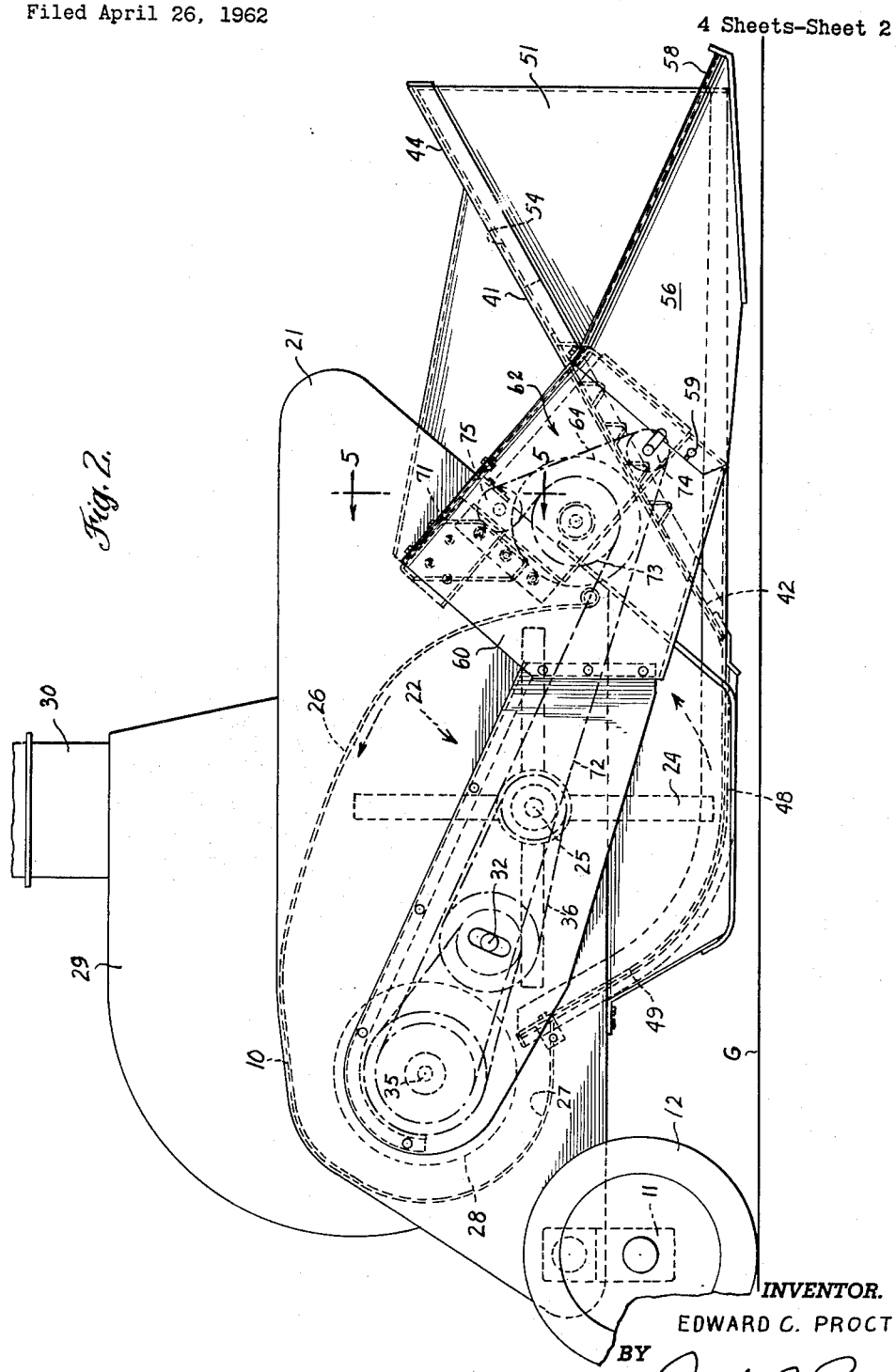

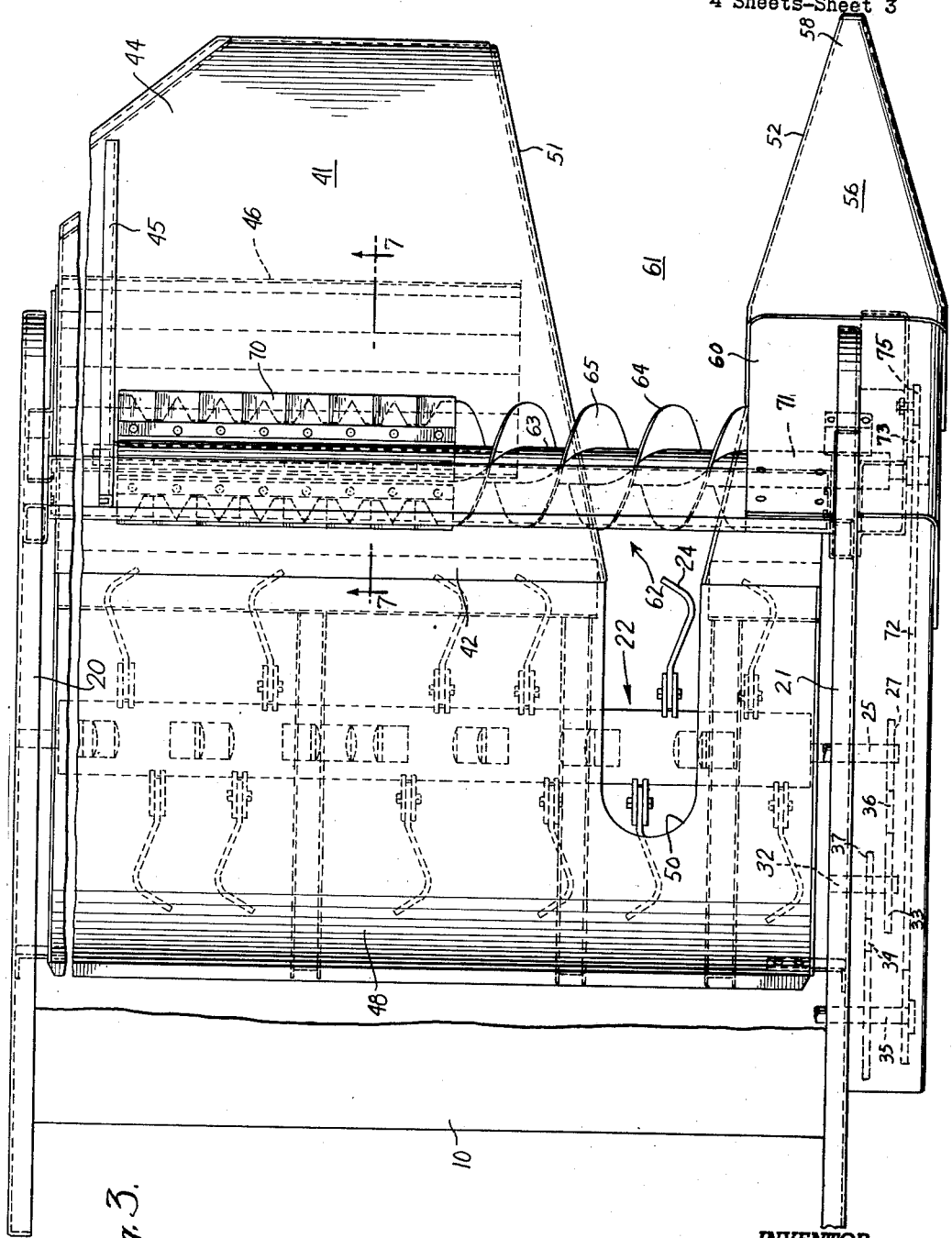

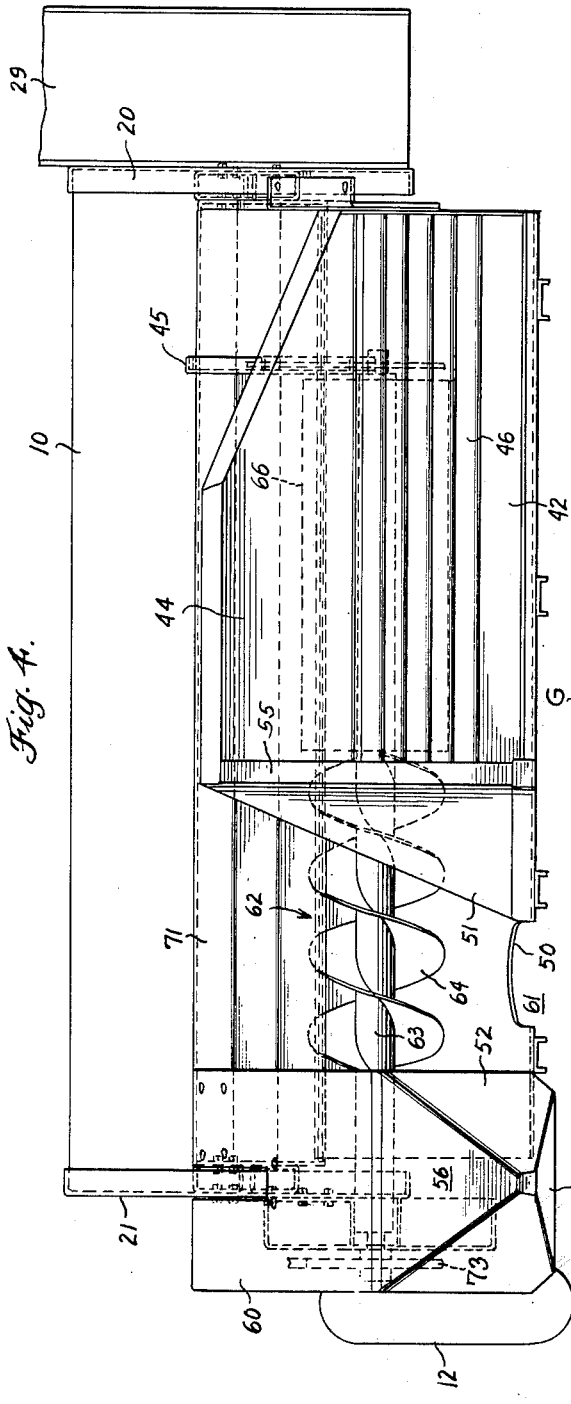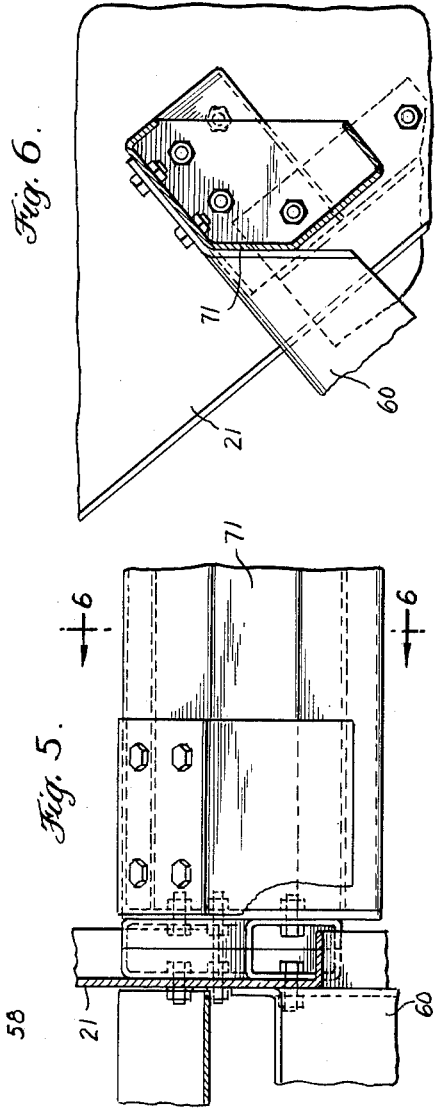

United States Patent Office 3,141,282
Patented July 21, 1964

3,141,282
FLAIL TYPE ROW CROP HARVESTER
Edward C. Procter, New Holland, Pa., assignor to Sperry Rand Corporation, New Holland, Pa., a corporation of Delaware
Filed Apr. 26, 1962, Ser. No. 190,284
8 Claims. (Cl. 56—24)

This invention relates to flail type forage harvesters, as shown for example in U.S. Patent No. 2,990,667. More particularly, the invention relates to an attachment for such a flail type forage harvester to enable it to be used in harvesting row crops.

A flail type harvester has a rotary cutter which operates on an axis transverse to the direction of travel of the machine. Radially extending flail knives are carried on a rotatable shaft and these knives operate to sever the standing crop and to throw cut material to a mechanism which will transfer it to a blower for discharge to a trailing wagon. The flail knives operate within a hood open at the bottom to provide access to the material to be harvested. Generally, such a machine is used in harvesting grass crops and is not adapted for harvesting row crops such as corn.

Heretofore, attempts have been made to provide attachments for flail harvesters to enable them to be used for handling row crops. However, such attachments have met with only limited success because they operate with far less efficiency than conventional row crop harvesters, and crop losses are too great.

The main object of this invention is to provide an improved attachment for a flail type forage harvester to enable the harvester to be used in harvesting tall row crops.

Another object of this invention is to provide a row crop attachment for a flail type harvester wherein the attachment will maintain proper control of the crop to secure effective harvesting and minimum crop losses.

Another object of this invention is to provide a row crop attachment of the character described so constructed that one lateral half of the flail harvester to which it is attached is used for gathering the standing crop and the other lateral half is used for chopping the crop.

A further object of this invention is to provide novel infeed means, in an attachment of the character described, provision being made to accommodate variations in the quantity of crop material being fed into the harvester.

A still further object of this invention is to provide a flail type harvester attachment which is ruggedly constructed and of simple design whereby it may be manufactured at low cost and subject to extensive use with low maintenance.

Other objects of this invention will be apparent hereinafter from the specification and from the recital in the appended claims.

In the drawings:
FIG. 1 is a perspective view of a flail type harvester having a row crop attachment connected thereto constructed according to this invention;
FIG. 2 is a fragmentary side elevation on an enlarged scale and looking from the right side of the machine;
FIG. 3 is a fragmentary plan view of the attachment with portions of the harvester unit removed to show the details of construction of the attachment;
FIG. 4 is a front elevation of the harvester;
FIG. 5 is an enlarged fragmentary section taken on the line 5—5 of FIG. 2 looking in the direction of the arrows;
FIG. 6 is a section taken on the line 6—6 of FIG. 5 looking in the direction of the arrows;
FIG. 7 is a section taken on the line 7—7 of FIG. 3 looking in the direction of the arrows;

FIG. 8 is a fragmentary plan view of the infeed roll of the attachment; and
FIG. 9 is a diagrammatic plan view illustrating the operation of the attachment in receiving row crop material.

Referring now to the drawings by numerals of reference and first to FIG. 1, H denotes a flail type harvester which is adapted to travel from left to right in FIG. 1. Harvester H has a housing 10 which extends transverse to the direction of travel of the machine and is of such width that it traverses at least two rows. The housing 10 is carried spaced from the ground G on a frame 11 supported on ground wheels, one of which is shown at 12. Along the left hand side of the machine, a tongue 14 projects forwardly and has a clevis 15 at its forward end to be connected to the drawbar of a tractor, not shown, for towing the harvester. A jackstand 16 is provided to support tongue 14 when the tongue is disconnected from the drawbar. Power is adapted to be transmitted to the harvester through a power-take-off assembly 18, such assembly extending above the tongue 14 and in a fore-and-aft direction.

Housing 10 has forwardly projecting side plates 20 and 21 on which a cutter 22 is rotatably mounted as best shown in FIG. 2. When viewed as shown in FIG. 2, the cutter has flails or knives 24 which travel in a counterclockwise direction, being carried on a transversely extending shaft 25. The flails are angularly spaced about shaft 25 and they are located at spaced intervals along the axis of the shaft. The knife arrangement may be similar to that shown in U.S. Patent No. 2,990,667. The housing 10 completely encloses cutter 22 from above and forms a curved arcuate portion 26 which serves to guide material cut and then thrown by the flail knives 24. The knives cast cut material upwardly and rearwardly along the inside of the wall 26 and the material is deposited in a transversely extending trough 27. An auger 28 is operable in the through to transversely convey chopped material toward the left of the harvester and into a blower housing 29. As is conventional, a fan unit not shown and operable in the blower housing operates to engage the delivered forage material and to cast it upwardly through outlet 30 to a spout 31 through which the material is discharged.

For rotating cutter 22 and auger 28, power is transmitted from power-take-off assembly 18 through a gear box to the fan in blower housing 29. From the fan, a pulley and belt connection is provided to the end of shaft 25 adjacent wall 20. Such drive structure is conventional and not shown. The end of shaft 25 adjacent side wall 21 has a sprocket 27 which drives through a chain 36 to a sprocket 33 on stub shaft 32. A smaller sprocket 37 is connected to a shaft 35 of auger 28 through a chain 34. Thus, auger 28 is driven from cutter shaft 25 but at a much slower speed.

To enable the harvester H to handle corn and other tall row crops, an attachment 40 is provided which comprises an inclined table 41 carried on the frame of the harvester and located along the left side of the machine in front of the left half of rotary cutter 22. Table 41 has a lower rear portion 42 which is adjacent ground G and an upper forward portion 44 which is substantially spaced from the ground. The angle between the table 41 and the ground is approximately thirty degrees. The table is connected to side plate 20 of the harvester through an upright wall 45 and it is supported cantilever fashion therefrom. Corrugated plate 46 is connected to the underside of table 41 to strengthen it. The top of the table is smooth and uninterrupted so that crop material will readily slide thereon.

The lower end 42 of the table 41 is connected to a pan 48 which extends beneath cutter 22. Pan 48 traverses the width of the harvester and forms a continuation of table 41, sweeping beneath cutter 22 and then upwardly and rearwardly at 49 to the forward edge of trough 27. Thus, rotary cutter 22 is enclosed from above by hood 10 and curved portion 26 and from below by the pan 48. Material is able to reach cutter 22 through the space between the lower forward edge of hood portion 26 and the bottom portion of table 41. The only exposure to the ground G for cutter 22 is by means of a fore-and-aft extending cut-out 50 which is open in a forward direction. The table 41 is so located that it is adapted to pass over a row of previously cut crop material while the cut-out 50 is laterally spaced therefrom to register with the row of crop material C to be harvested.

For guiding the standing crop material to the opening 50, a pair of vertically extending walls 51 and 52 are provided. The wall 51 extends downwardly from table 41, having an inclined upper edge 54 contiguous to the inclined slope of the table. The forward edge 55 of wall 51 extends vertically. The wall 52 forms part of a divider 56 which is generally V-shaped when viewed in plan and operable, as is conventional, to separate the standing row of material to be harvested from adjacent crop material. Divider 56 comprises a pointed forward section 58 pivotally connected at 59 (FIG. 2) to a fixed upper section 60 whereby the front section of the divider may swing upwardly at its forward end in the event that it strikes a rock or other obstruction. The structure is such that the divider is held against pivoting downwardly from its normal position as shown.

The walls 51 and 52 diverge outwardly at their forward ends and they are spaced laterally relative to each other to define an unobstructed fore-and-aft extending inlet passage 61 which registers with the cut-out 50 in pan 48. When the machine is operated in the field, the operator directs the implement so that the inlet passage 61 registers with the crop C to be harvested (FIG. 9) while the table 41 extends over a previously harvested row. The construction of the attachment is such that the standing material, if projecting in an erect manner, passes between the walls 51 and 52 without being moved thereby. However, if the row of crop material is fallen toward the right, the divider 56 will lift it to thereby insure that it is fed through the passage 61.

Extending transversely behind the table 41, walls 51 and 52 and divider 56, and in front of rotary cutter 22, is rotary means 62. Such rotary means comprises an auger section 64 which extends across a rearward portion of the inlet passage 61 and is located in fore-and-aft alignment with the rear portion 42 of the table 41 and spaced vertically above the table. The direction of rotation of the shaft 63 of conveying means 64 is such that flights 65 thereon operate to convey standing material to the left and toward table 41. Responsive to the forward travel of the implement and the lateral conveying force by conveying means 64, the crop material is moved laterally and deposited on the table 41 as shown in FIG. 9. During such movement the standing material is still connected to the ground G. It is only subsequent to such lateral conveyance that the ground end of the crop material is engaged by the flails 24 of the cutter unit 22 which register with the cut-out 50 to sever the standing crop from the ground.

Material deposited on the table 41 is conveyed down the incline of the table to rotary cutter 22 by infeed means in the form of a roll 66 shown best in FIGS. 3, 7 and 8. Roll 66 comprises radially extending angularly spaced steel slats 68 formed in saw tooth fashion to provide teeth 69. The slats 68 are carried on the same shaft 63 as the conveying means 64. Connected to the slats and projecting radially beyond the teeth 69 are heavy, flexible, fingers 70 of canvas, hard rubber or the like which sweep along the surface of table 41 to exert an aggressive downward and rearward feeding action on crop material supported on the table. These fingers also serve to keep roll 66 from wrapping by shielding the teeth 69 and preventing material from becoming impaled thereon.

The shaft 63 is supported on side plate 21 of the harvester and on the side wall 45 of table 41. Shaft 63 rotates about a fixed axis and the infeed roll 66 does not float relative to the table. Nevertheless, variations in the amount of material being fed can be accommodated by the flexible finger 70 which will pivot away from the table responsive to the quantity of material thereon. The spaces between the teeth 69 of the slats 68 serve to accommodate ears of corn or thick stalk material to be fed into the rotary cutter 22.

Mounted above conveying section 64 and infeed roll 66 is a bumper bar 71 which holds together attachment 40 and maintains table 41 and divider 56 in proper spaced relation. Bar 71 is located rearwardly of shaft 63 of the rotary means 62 and operates to prevent material from bending rearwardly over the housing 10 to thereby assist conveying means 64 in directing the material forwardly, downwardly and laterally to the table 41. If, when the crop material is conveyed onto table 41, ears of corn or other material is knocked off, it merely falls upon the surface of the table and slides downwardly and rearwardly to infeed roll 66 for movement to rotary cutter 22. The rapidly rotating flail knives 24 of cutter 22 chop the material as it is fed to it and throws the material upwardly and rearwardly along top wall 26 to trough 27 so that it may be conveyed by auger 28 into blower housing 29 for subsequent discharge through spout 31 to a trailing wagon. The portion of cutter unit 22 along cut-out 50 is relegated merely to severing the standing crop from the ground. It is the axial portion of the cutter from the cut-out 50 toward the sidewall 21 of the harvester that does the chopping.

For driving the rotary means 62, a drive chain 72 is provided which is connected to the shaft 35 of auger 28. A backwrap arrangement is provided as shown in FIG. 2 including driven sprocket 73 and idler sprockets 74 and 75. Since the shaft 63 of the rotary means 62 rotates about a fixed axis, the drive to operate the gathering means and the infeed roll is relatively simple and inexpensive.

In operating attachment 40, the pivoting of divider 56 will enable it to respond to variations in ground conditions and its pointed section 58 will separate the standing crop from material adjacent to it. The cooperating walls 51 and 52 will guide the material through inlet passage 61 and the material will stand erect until it engages the gathering means 64. Then the auger flights 65 will convey the material laterally toward the table 41 and simultaneously the material will be bent forwardly by engagement with the shaft 63 and the bumper bar 71. The crop material will assume an upwardly, forwardly and laterally inclined position on table 41, FIG. 9. After the material has been gathered and conveyed laterally, it is severed from the ground by the knives 24 of cutter 22. The infeed roll 66 operates on material supported on table 21 to convey it downwardly and rearwardly to cutter 22. The arrangement is such that there is efficient harvesting of the crop material with little loss of ears or the like. The structure employed is rugged and it enables the use of a conventional flail type forage harvester for handling tall row crops and without changing the basic structure of the harvester.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:
1. A harvester for corn and other tall row crops com- prising, in combination, a mobile frame adapted for ground travel forwardly and being of such width that it traverses two rows at least, a table mounted on one side of said frame to extend over a previously cut row and laterally spaced from a next adjacent row of standing material to be harvested, said table being inclined and having a rear portion adjacent the ground and a forward portion substantially spaced from the ground whereby the table extends at an acute angle to the ground, a pair of vertically extending forwardly diverging walls on the opposite side of said frame and laterally spaced relative to each other throughout their entire lengths to define an unobstructed fore-and-aft inlet passage in register with and adapted to receive said row of standing material, rotatable means carried on said frame and having a gathering section extending across a rearward portion of said inlet passage and an infeed section extending over said rear portion of said table, said gathering section comprising an auger which engages said standing material and conveys it laterally onto said inclined table, cutting means supported on said frame and rotatable about a transverse axis, said cutting means being located rearwardly of both said gathering section and said table and operable to sever the standing crop from the ground only after the crop has been gathered and conveyed toward said table, said infeed section being operable to feed table borne crop material along the incline of the table and downwardly and rearwardly to said cutting means.

2. A harvester for corn and other tall row crops as recited in claim 1 wherein a first wall of said pair of walls and on the side of said frame remote from said table comprises a wall of a crop divider generally V-shaped in plan and having a pointed forward end to separate the row of standing material to be harvested from adjacent standing material.

3. A harvester for corn and other tall row crops as recited in claim 2 wherein said divider is connected at its rear and to said frame for pivotal movement relative thereto about a transverse axis and from a normal position.

4. A harvester for corn and other tall row crops as recited in claim 1 wherein a second wall of said pair of walls has an inclined top edge, connected to said table and coextensive therewith, and a generally vertically extending forward edge.

5. A harvester for corn and other tall row crops as recited in claim 1 wherein said infeed section of said rotatable means is rotatable about a fixed axis and having radially projecting conveying elements extending parallel to the axis of the rotatable means and spaced from said table, and members on said conveying elements which shield them and yield upon engagement with crop material on the table.

6. A harvester for corn and other tall crops as recited in claim 5 wherein said conveying elements have spaced teeth along their outer edges, said yieldable members comprising flexible fingers projecting beyond said elements and closing the spaces between the teeth.

7. A harvester for corn and other tall row crops as recited in claim 1 wherein a pan is provided beneath said cutting means to catch crop material fed by said infeed means, said pan being connected to and forming a continuation of said lower portion of said table and having a section behind said gathering means formed with a fore-and-aft cut-out communicating with said inlet passage.

8. A harvester for corn and other row crops as recited in claim 1 wherein a side wall extends upwardly from said table along the side thereof remote from said inlet passage, said rotatable means being mounted at one end on said side wall.

References Cited in the file of this patent

UNITED STATES PATENTS 2,725,704  Skromme _____ Dec. 6, 1955

FOREIGN PATENTS 1,248,374  France _____ Oct. 31, 1960
101,743  Netherlands _____ June 15, 1962